US010880717B2

United States Patent
Xiong et al.

(10) Patent No.: US 10,880,717 B2
(45) Date of Patent: Dec. 29, 2020

(54) DEMODULATION REFERENCE SIGNAL (DMRS) SEQUENCE DESIGN FOR DEVICE-TO-DEVICE (D2D) DISCOVERY

(71) Applicant: APPLE INC., Cupertino, CA (US)

(72) Inventors: Gang Xiong, Beaverton, OR (US); Debdeep Chatterjee, San Jose, CA (US); Huaning Niu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/791,308

(22) Filed: Oct. 23, 2017

(65) Prior Publication Data

US 2018/0109938 A1    Apr. 19, 2018

Related U.S. Application Data

(63) Continuation of application No. 14/669,823, filed on Mar. 26, 2015, now abandoned.
(Continued)

(51) Int. Cl.
| | |
|---|---|
| *H04W 8/00* | (2009.01) |
| *H04W 76/02* | (2009.01) |
| *H04W 72/04* | (2009.01) |
| *H04W 4/00* | (2018.01) |
| *H04L 5/00* | (2006.01) |
| *H04W 72/00* | (2009.01) |
| *H04W 4/70* | (2018.01) |
| *H04W 76/14* | (2018.01) |
| *H04W 76/10* | (2018.01) |

(52) U.S. Cl.
CPC .......... *H04W 8/005* (2013.01); *H04L 5/0016* (2013.01); *H04L 5/0048* (2013.01); *H04L 5/0051* (2013.01); *H04W 4/70* (2018.02); *H04W 72/0446* (2013.01); *H04W 76/10* (2018.02); *H04W 76/14* (2018.02); *H04W 72/00* (2013.01)

(58) Field of Classification Search
None
See application file for complete search history.

(56) References Cited

U.S. PATENT DOCUMENTS

| | | | |
|---|---|---|---|
| 2010/0248732 A1* | 9/2010 | Baldemair | H04L 7/041 455/450 |
| 2012/0300728 A1 | 11/2012 | Lee et al. | |

(Continued)

OTHER PUBLICATIONS

3GPP TS 36.101; "3rd Generation Partnership Project; Technical Specification Group Radio Access Network; Evolved Universal Terrestrial Radio Access (E-UTRA); User Equipment (UE) radio transmission and reception"; (Dec. 2013); 507 pages; V 12.2.0, Release 12.

(Continued)

*Primary Examiner* — Ruihua Zhang

(57) ABSTRACT

Technology for a user equipment (UE) operable to perform device-to-device (D2D) communication is disclosed. The UE can select a cyclic shift ($n_{CS}$) that is randomly selected from a set of cyclic shifts. The set of cyclic shifts can include cyclic shift values of {0, 3, 6, 9}. The UE can apply the selected cyclic shift to all demodulation reference signals (DM-RSs) in a subframe. Each of the DM-RSs can be associated with a D2D transmission from the UE. The UE can encode the DM-RSs for transmission from the UE.

14 Claims, 12 Drawing Sheets

Related U.S. Application Data

(60) Provisional application No. 61/990,643, filed on May 8, 2014.

(56) References Cited

U.S. PATENT DOCUMENTS

| | | | | |
|---|---|---|---|---|
| 2013/0034011 | A1* | 2/2013 | Yoon | H04L 5/0048 370/252 |
| 2014/0078972 | A1* | 3/2014 | Sorrentino | H04L 27/2613 370/329 |
| 2014/0198764 | A1 | 7/2014 | Han et al. | |
| 2015/0271814 | A1 | 9/2015 | Park et al. | |
| 2016/0007269 | A1* | 1/2016 | Chae | H04L 5/0048 370/330 |
| 2016/0037547 | A1* | 2/2016 | Yang | H04W 4/70 370/329 |
| 2016/0094446 | A1 | 3/2016 | Kazmi et al. | |
| 2016/0157287 | A1 | 6/2016 | Chae et al. | |
| 2016/0337103 | A1* | 11/2016 | Kim | H04L 5/0048 |
| 2017/0027013 | A1 | 1/2017 | Kim et al. | |
| 2017/0034687 | A1* | 2/2017 | Yu | H04W 72/04 |

OTHER PUBLICATIONS

3GPP TS 36.213; "3$^{rd}$ Generation Partnership Project; Technical Specification Group Radio Access Network; Evolved Universal Terrestrial Radio Access (E-UTRA); Physical layer procedures"; (Mar. 2014); 127 pages; V 10.12.0, Release 10.

SA2; "LS reply on discovery message size"; 3GPP TSG S2-140568; (Jan. 20-24, 2014); 2 pages; SA2 Meeting #101, Taipei, Taiwan; Release 12.

Chairman Notes; "RAN1 Chairman's Notes"; 3GPP TSG; (Oct. 7-11, 2013); 45 pages; RAN WG1 Meeting #74bis, Guangzhou, China.

Chairman Notes; "RAN1 Chairman's Notes"; 3GPP TSG; (Feb. 10-14, 2014); 56 pages; RAN WG1 Meeting #76, Prague, Czech Republic.

3GPP TS 36.212; "3$^{rd}$ Generation Partnership Project; Technical Specification Group Radio Access Network; Evolved Universal Terrestrial Radio Access (E-UTRA); Multiplexing and channel coding"; (Mar. 2011); V 10.1.0, Release 10.

3GPP TS 36.331; "3$^{rd}$ Generation Partnership Project; Technical Specification Group Radio Access Network; Evolved Universal Terrestrial Radio Access (E-UTRA); Radio Resource Control (RRC); Protocol specification"; (Mar. 2011); 290 pages; V 10.1.0, Release 10.

3GPP TS 36.211; "3$^{rd}$ Generation Partnership Project; Technical Specification Group Radio Access Network; Evolved Universal Terrestrial Radio Access (E-UTRA); Physical Channels and Modulation"; (Mar. 2011); 103 pages; V 10.1.0, Release 10.

3GPP TS 36.213; "3$^{rd}$ Generation Partnership Project; Technical Specification Group Radio Access Network; Evolved Universal Terrestrial Radio Access (e-UTRA); Physical layer procedures"; (Mar. 2011); 115 pages; V10.1.0, Release 10.

Qualcomm Incorporated; "Study on LTE Device to Device Proximity Services"; 3GPP TSG RP-12009; (Dec. 2013); 6 pages; RAN Meeting #58; Agenda 13.2.

3GPP TS 36.212; "3$^{rd}$ Generation Partnership Project; Technical Specification Group Radio Access Network; Evolved Universal Terrestrial Radio Access (E-UTRA); Multiplexing and channel coding"; (Sep. 2012); 79 pages; V 11.0.0, Release 11.

3GPP TS 36.331; "3$^{rd}$ Generation Partnership Project; Technical Specification Group Radio Access Network; Evolved Universal Terrestrial Radio Access (E-UTRA); Radio Resource Control (RRC); Protocol specification"; (Jun. 2012); V 11.0.0, Release 11.

3GPP TS 36.211; "3$^{rd}$ Generation Partnership Project; Technical Specification Group Radio Access Network; Evolved Universal Terrestrial Radio Access (E-UTRA); Physical Channels and Modulation"; (Sep. 2012); 106 pages; V 11.0.0, Release 11.

3GPP TS 36.213; "3$^{rd}$ Generation Partnership Project; Technical Specification Group Radio Access Network; Evolved Universal Terrestrial Radio Access (E-UTRA); Physical layer procedures"; (Sep. 2012); 143 pages; V 11.0.0, Release 11.

* cited by examiner

Orthogonal sequences $[w(0) \cdots w(2)]$ for $K = 3$

| Sequence index $n_{oc}$ | Orthogonal sequences $[w(0) \cdots w(2)]$ |
|---|---|
| 0 | $[1 \quad 1 \quad 1]$ |
| 1 | $[1 \quad e^{j2\pi/3} \quad e^{j4\pi/3}]$ |
| 2 | $[1 \quad e^{j4\pi/3} \quad e^{j2\pi/3}]$ |

FIG. 2A

Orthogonal sequences $[w(0) \cdots w(3)]$ for $K = 4$

| Sequence index $n_{oc}$ | Orthogonal sequences $[w(0) \cdots w(3)]$ |
|---|---|
| 0 | $[+1 \quad +1 \quad +1 \quad +1]$ |
| 1 | $[+1 \quad -1 \quad +1 \quad -1]$ |
| 2 | $[+1 \quad +1 \quad -1 \quad -1]$ |
| 3 | $[+1 \quad -1 \quad -1 \quad +1]$ |

FIG. 2B

Orthogonal sequences $[w(0) \cdots w(4)]$ for $K=5$

| Sequence index $n_{oc}$ | Orthogonal sequences $[w(0) \cdots w(4)]$ |
|---|---|
| 0 | $[1 \ 1 \ 1 \ 1 \ 1]$ |
| 1 | $[1 \ e^{j2\pi/5} \ e^{j4\pi/5} \ e^{j6\pi/5} \ e^{j8\pi/5}]$ |
| 2 | $[1 \ e^{j4\pi/5} \ e^{j8\pi/5} \ e^{j2\pi/5} \ e^{j6\pi/5}]$ |
| 3 | $[1 \ e^{j6\pi/5} \ e^{j2\pi/5} \ e^{j8\pi/5} \ e^{j4\pi/5}]$ |
| 4 | $[1 \ e^{j8\pi/5} \ e^{j6\pi/5} \ e^{j4\pi/5} \ e^{j2\pi/5}]$ |

FIG. 2C

Orthogonal sequences $[w(0) \cdots w(3)]$ for $M = 2$

| Sequence index $n_{oc}$ | Orthogonal sequences $[w(0) \cdots w(3)]$ |
|---|---|
| 0 | $[+1 \quad +1 \quad +1 \quad +1]$ |
| 1 | $[+1 \quad -1 \quad +1 \quad -1]$ |
| 2 | $[+1 \quad +1 \quad -1 \quad -1]$ |
| 3 | $[+1 \quad -1 \quad -1 \quad +1]$ |

FIG. 4A

Orthogonal sequences $[w(0) \cdots w(5)]$ for $M = 3$

| Sequence index $n_{oc}$ | Orthogonal sequences $[w(0) \cdots w(5)]$ |
|---|---|
| 0 | $[1\ 1\ 1\ 1\ 1\ 1]$ |
| 1 | $[1\ e^{j\pi/3}\ e^{j2\pi/3}\ -1\ e^{j4\pi/3}\ e^{j5\pi/3}]$ |
| 2 | $[1\ e^{j2\pi/3}\ e^{j4\pi/3}\ 1\ e^{j2\pi/3}\ e^{j4\pi/3}]$ |
| 3 | $[1\ -1\ 1\ -1\ 1\ -1]$ |
| 4 | $[1\ e^{j4\pi/3}\ e^{j2\pi/3}\ 1\ e^{j4\pi/3}\ e^{j2\pi/3}]$ |
| 5 | $[1\ e^{j5\pi/3}\ e^{j4\pi/3}\ -1\ e^{j2\pi/3}\ e^{j\pi/3}]$ |

FIG. 4B

Orthogonal sequences $[w(0) \cdots w(7)]$ for $M = 4$

| Sequence index $n_{oc}$ | Orthogonal sequences $[w(0) \cdots w(7)]$ |
|---|---|
| 0 | [1  1  1  1  1  1  1  1] |
| 1 | [1  −1  1  −1  1  −1  1  −1] |
| 2 | [1  1  −1  −1  1  1  −1  −1] |
| 3 | [1  −1  −1  1  1  −1  −1  1] |
| 4 | [1  1  1  1  −1  −1  −1  −1] |
| 5 | [1  −1  1  −1  −1  1  −1  1] |
| 6 | [1  1  −1  −1  −1  −1  1  1] |
| 7 | [1  −1  −1  1  −1  1  1  −1] |

FIG. 4C

DEMODULATION REFERENCE SIGNAL (DMRS) SEQUENCE DESIGN FOR DEVICE-TO-DEVICE (D2D) DISCOVERY

RELATED APPLICATIONS

The present application is a continuation of U.S. patent application Ser. No. 14/669,823, filed Mar. 26, 2015, which claims the benefit of U.S. Provisional Patent Application Ser. No. 61/990,643, filed May 8, 2014, all of which are hereby incorporated by reference in their entirety.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 2A depicts a set of orthogonal cover codes (OCCs) for each value of demodulation reference signal (DMRS) sequences within a single subframe in accordance with an example;

FIG. 2B depicts a set of orthogonal cover codes (OCCs) for each value of demodulation reference signal (DMRS) sequences within a single subframe in accordance with an example;

FIG. 2C depicts a set of orthogonal cover codes (OCCs) for each value of demodulation reference signal (DMRS) sequences within a single subframe in accordance with an example;

FIG. 4A depicts a set of orthogonal cover codes (OCCs) for each value of subframes within a device to device (D2D) discovery resource in accordance with an example;

FIG. 4B depicts a set of orthogonal cover codes (OCCs) for each value of subframes within a device to device (D2D) discovery resource in accordance with an example;

FIG. 4C depicts a set of orthogonal cover codes (OCCs) for each value of subframes within a device to device (D2D) discovery resource in accordance with an example;

Figure 1:
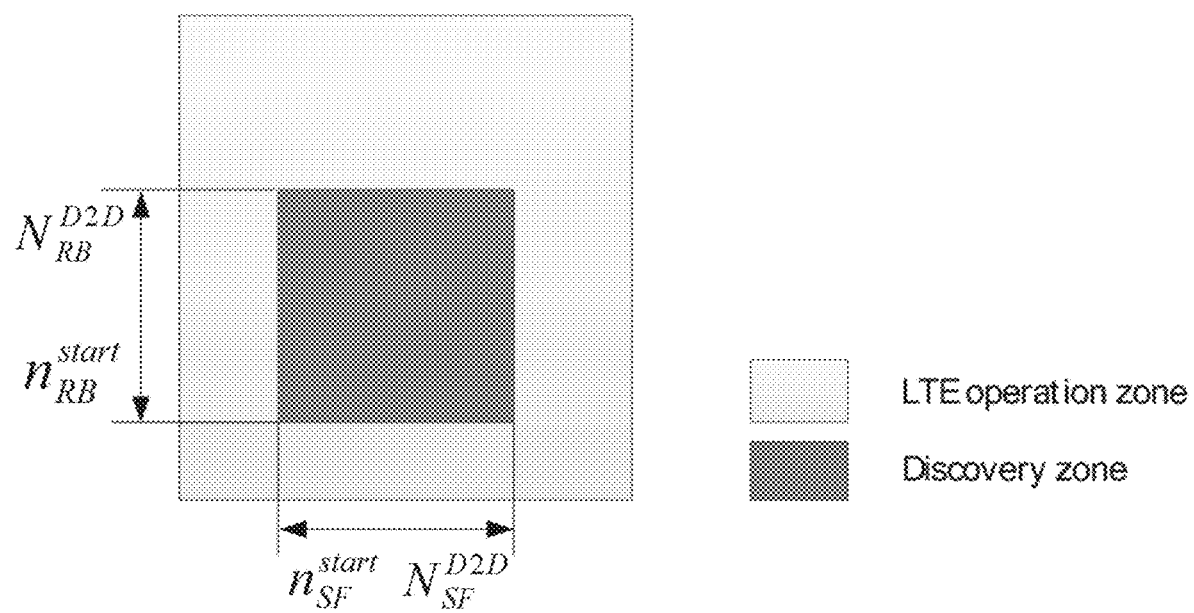
FIG. 1 illustrates a device to device (D2D) discovery zone within an LTE operation zone in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A technology is described for a novel demodulation reference signal (DMRS) sequence design for device to device (D2D) discovery. When D2D discovery is performed by a user equipment (UE), the UE can send a DMRS sequence using a discovery resource. The DMRS sequence can be selected from a pool of DMRS sequences. When the discovery resource spans multiple subframes, the UE can select a novel orthogonal code cover (OCC) to be applied to the DMRS sequences. When additional DMRS sequences are present within the discovery resource of a single subframe, the UE can select a novel OCC to be applied to the DMRS sequences. The application of the novel OCC can result in an increased capacity of the DMRS sequences. In one configuration, the DMRS sequence design can enable the UE to perform repeated transmissions of a D2D discovery signal within a discovery period. The UE can randomly select a first DMRS sequence to be transmitted using a first discovery resource, and then subsequent DMRS sequences that are associated with the first DMRS sequence can be transmitted using subsequent discovery resources that are associated with the first discovery resource, thereby reducing a processing power at the UE. In one configuration, the DMRS sequence design can be applicable to both Type 1 D2D discovery and Type 2 D2D discovery. In addition, the UE can utilize only a subset of the pool of DMRS sequences in order to reduce DMRS blind detection complexity, and thereby, UE power consumption.

Device to device (D2D) communication for 3GPP LTE networks, such as an Evolved Universal Terrestrial Radio Access network (E-UTRAN), is being standardized in 3GPP LTE Release 12. A D2D communication is a direct communication between two devices, such as two user equipments (UEs). The two devices (e.g., LTE-based devices) can communicate directly with one another when the two devices are in close proximity, but such D2D communications do not use the cellular network infrastructure. D2D discovery is generally the first step performed at the UE to enable a D2D service. One particular application for D2D communications is related to public safety services. Furthermore, D2D communication can allow direct communication from one UE to one or more target or receiving UEs, thus enabling group communication. Examples described herein can refer to transmission to a target or receiving UE, but it should be understood that this could also be a transmission to a group of target or receiving UEs.

D2D can allow a direct link between two UEs that are using the cellular spectrum. As a result, media or other data can be transferred from one device to another device over short distances and using a direct connection. By using D2D data communications, the data can be communicated directly without being relayed to the cellular network, thereby avoiding problems with lack of or poor network coverage or with overloading the network. The cellular infrastructure, if present can assist with other issues, such as peer discovery, synchronization, and the provision of identity and security information.

The use of D2D communication can provide several benefits to users. For example, the devices can be remote from cellular infrastructure. D2D can allow devices to communicate locally, even when the cellular network has failed (e.g., during a disaster) because D2D communication does not rely on the network infrastructure. By using licensed spectrum, the frequencies used to perform the D2D communications are less subject to interference. In addition, if the two devices are in close proximity, then reduced transmission power levels are used, thereby saving power at the devices.

D2D communication features can be referred to as ProSe (Proximity Services) Direct Commination in the 3GPP LTE standard. D2D communications are primarily targeted for public safety use cases, but can be used for other applications as well. The D2D feature enables the direct communication between UEs over the cellular radio spectrum, but without the data being carried by the cellular network infrastructure. D2D communication can occur when the UE is outside of the coverage of the cellular network, or alternatively, when the UE in within coverage of the cellular network. Within the access stratum of the UE, the D2D data can be carried by a D2D radio bearer.

In one example, a UE can transmit a D2D discovery message in order to perform D2D discovery. A physical uplink shared channel (PUSCH) can be used to transmit the D2D discovery message. The D2D discovery message can include a demodulation reference signal (DMRS) sequence. In addition, D2D discovery can utilize a cyclic redundancy code (CRC) between 16 and 24 bits, channel encoding (e.g., turbo or tail-biting convolutional codes), rate matching for bit size matching and the generation of multiple transmissions, and scrambling for interference randomization. The UE can transmit the D2D discovery message during a discovery period. For each discovery period, the UE can transmit on a randomly selected discovery resource. When the UE is within a coverage area of an evolved node B (eNB), the discovery period and the amount of discovery resources can be configured by the eNB. In one example, the discovery resource can have a duration of at least one millisecond (ms). The duration can be selected based on a size of a media access control (MAC) protocol data unit (PDU), in which case the duration can be a multiple of 1 ms and include consecutive D2D subframes. The discovery resource can be used for a single transmission of a given discovery MAC PDU by the UE.

When the UE is within network coverage, the eNB can periodically allocate certain discovery resources in the form of D2D discovery regions for the UE. The UE can use these discovery resources in order to transmit discovery information. The discovery information can include one or more DMRS sequences, which can be used to perform channel estimation, and timing offset and frequency offset estimation for uplink transmissions. The discovery information can be in the form of a discovery packet with payload information or a discovery packet preceded by a discovery preamble. One or more resource blocks (RB) can be used for a discovery packet transmission during D2D discovery, which is denoted as $L_{RB}^{D2D}$, depending on a payload size and overall discovery performance requirements.

FIG. 1 illustrates an exemplary device to device (D2D) discovery zone within an LTE operation zone. The LTE operation zone can be composed of periodic D2D discovery zones (DZ), wherein each DZ includes a defined number of resource blocks (RBs) in a frequency domain and a defined number of subframes in a time domain. As shown in FIG. 1, $N_{RB}^{D2D}$, $n_{RB}^{start}$, $N_{SF}^{D2D}$ and $n_{SF}^{start}$ are denoted as a number of allocated RBs, a starting RB index, a number of subframes, and a starting subframe index of each discovery zone, respectively.

The UE can receive information regarding a partitioning of the LTE operation zone (or D2D discovery regions) via semi-statically signaling from the eNB. For example, the eNB can use radio resource control (RRC) signaling to communicate the information to the UE. In particular, the eNB can send the information via a system information block (SIB) when the UE is within a coverage area of the eNB. When the UE has partial network coverage, information regarding the configuration of the discovery resources (i.e., the partitioning of the LTE operation zone) can be forwarded by one or a plurality of UEs that are within network coverage to the UE with partial network coverage. When the UE is out of network coverage, the discovery zone can be predefined or broadcasted by a centralized D2D device or be associated with and signaled by an independent synchronization source, with the configuration further forwarded by other dependent/gateway synchronization sources.

In one configuration, a legacy PUSCH structure with a DMRS sequence can be used for a D2D discovery message transmission. In previous techniques, multiple mutually orthogonal reference signals can be generated by employing different cyclic shifts of Zadoff-Chu sequence and applying orthogonal cover codes to two reference-signal transmissions within a subframe. More specifically, length-2 orthogonal cover codes [1 1] and [1 −1] can be utilized.

In Type 1 D2D discovery, the UE can perform contention based D2D discovery or D2D discovery with UE-autonomous selection of discovery resources. In other words, the UE can select the discovery resources used for transmitting D2D discovery messages (e.g., a discovery packet), as opposed to the eNB selecting the discovery resources. The UE can also be referred to as a ProSe enabled device. The UE can randomly select the DMRS sequence when transmitting the discovery packet. The DMRS sequence can be used to perform channel estimation, and timing offset and frequency offset estimation for uplink transmissions. Therefore, the DMRS sequence can enable D2D discovery to be performed by the UE. The DMRS sequence can include a base sequence, which can be common with a plurality of other UEs or a function of the cell ID of the serving cell for in-coverage UEs. In addition, the DMRS sequence can include a random choice of the cyclic shift and/or the orthogonal cover code (OCC) index. The discovering UEs can perform detection of discovery preambles or packet detection in order to detect whether the discovery packet is present in the discovery resource. In addition, the discovering UEs can perform DM-RS identification in order to ensure appropriate channel estimation and timing/frequency offset compensation.

In legacy LTE solutions, 24 unique DMRS configurations are available. The 24 unique DMRS configurations are derived from 12 cyclic shifts and 2 OCC indices. However, only a subset of the 24 DMRS sequences may be configured for D2D UEs in order to maintain sufficient orthogonality between cyclic shifted versions of the same DM-RS base sequence. In addition, using the subset of the 24 DMRS sequences can ensure robustness against delay spread introduced by practical channels, and to reduce the DMRS blind detection complexity. For instance, D2D UE can select only one of the DMRS sequences for discovery packet transmission from a subset of DMRS sequences with $n_{CS} \in \{0,4,8\}$ and $n_{oc} \in \{0,1\}$, where $n_{CS}$ is the cyclic shift index and $n_{oc}$ is the orthogonal cover code index. In this example, the D2D UE can select from a subset consisting of six DMRS sequences.

In one example, the configuration of the subset of DMRS sequences can be pre-configured or semi-statically signaled to the UE by the eNB using RRC signaling, e.g., via system information blocks (SIBs) when the UE is within network coverage. For a partial network coverage scenario, the configuration can be forwarded by one or a plurality of UEs that are in-coverage to the UEs that are outside the network coverage area. For an out-of-network coverage scenario, the configuration can be predefined or broadcasted by a centralized D2D device. Alternatively, the configuration can be associated with and signaled by an independent synchronization source, with the configuration further forwarded by other dependent/gateway synchronization sources.

In one configuration, whether the D2D discovery is for public safety (PS) or non-PS can influence a size of the D2D discovery message transmitted from the UE. In other words, the message sizes for these two types of D2D discovery can be different. To support D2D discovery with different message sizes, the DMRS sequence can be used to carry one or more information bits to signal a particular payload size. For example, one subset of DMRS sequences with $n_{CS} \in \{0,4,8\}$ and $n_{oc} \in \{0\}$ can be used to indicate a message size of X bits, while another subset of DMRS sequences with $n_{CS} \in \{0,4,8\}$ and $n_{oc} \in \{1\}$ can be used to indicate a message size of Y bits.

The technology described herein relates to a novel DMRS sequence design for D2D discovery. The DMRS sequence design can account for three different scenarios: (1) a first scenario is for when a D2D discovery resource is one subframe and a number of DMRS sequences (or symbols) within the one subframe is at least three; (2) a second scenario is for when the D2D discovery resource is at least two subframes; and (3) a third scenario is for when the D2D discovery resource is at least two subframes and the number of DMRS sequences (or symbols) for each subframe is at least three.

With respect to the first scenario, a D2D discovery resource of a single subframe can be modified to include additional DMRS sequences (or symbols). The additional DMRS sequences can improve a channel estimation performance, as well as timing and frequency offset compensation. The D2D discovery resource of the single subframe can be used by the UE to send a D2D discovery message. In legacy solutions, only two DMRS sequences are within a single subframe. In the technology described herein, the number of DMRS sequences within a single subframe can be greater than two. The number of DMRS sequences within the single subframe can be denoted as K, wherein K is a positive integer greater than two. In one example, a length-K Discrete Fourier Transform (DFT) based sequence or Walsh-Hadamard based sequence can be utilized for a predetermined orthogonal cover code (OCC) that is applied to each DMRS sequence. The predetermined OCC can be selected based on a value of K. The length-K DFT based sequence or the Walsh-Hadamard based sequence can be utilized when the D2D discovery resource of the single subframe is modified to include the additional DMRS sequences. The UE can apply the predetermined OCC to each of the K DMRS sequences, and then transmit the K DMRS sequences using the D2D discovery resource of the single subframe. In one example, the UE can transmit the K DMRS sequences in the D2D discovery message using a physical uplink shared channel (PUSCH).

FIG. 2A is a table depicting a set of orthogonal cover codes (OCCs) when the number (K) of DMRS sequences (or symbols) within a D2D discovery resource of a single subframe is three (i.e., K=3). The set of OCCs can be used for D2D discovery at the UE. The orthogonal sequences can be based on a length-3 DFT code. The orthogonal sequences can be represented as [w(o) . . . . W(2)] when K=3. Each orthogonal sequence can be associated with a particular sequence index $n_{oc}$. For example, when the sequence index is 0, the orthogonal sequence is [1 1 1]. When the sequence index is 1, the orthogonal sequence is [1 $e^{j2\pi/3}$ $e^{j4\pi/3}$]. When the sequence index is 2, the orthogonal sequence is [1 $e^{j4\pi/3}$ $e^{j2\pi/3}$]. Therefore, an appropriate orthogonal sequence can be applied to the DMRS sequence when K=3.

FIG. 2B is a table depicting a set of orthogonal cover codes (OCCs) when the number (K) of DMRS sequences (or symbols) within a D2D discovery resource of a single subframe is four (i.e., K=4). The set of OCCs can be used for D2D discovery at the UE. The orthogonal sequences can be based on a length-4 Walsh-Hadamard code. The orthogonal sequences can be represented as [w(o) W(3)] when K=4. Each orthogonal sequence can be associated with a particular sequence index $n_{oc}$. For example, when the sequence index is 0, the orthogonal sequence is [+1 +1 +1 +1]. When the sequence index is 1, the orthogonal sequence is [+1 −1 +1 −1]. When the sequence index is 2, the orthogonal sequence is [+1 +1 −1 −1]. When the sequence index is 3, the orthogonal sequence is [+1 −1 −1 +1]. Therefore, an appropriate orthogonal sequence can be applied to the DMRS sequence when K=4.

FIG. 2C is a table depicting a set of orthogonal cover codes (OCCs) when the number (K) of DMRS sequences (or symbols) within a D2D discovery resource of a single subframe is five (i.e., K=5). The set of OCCs can be used for D2D discovery at the UE. The orthogonal sequences can be based on a length-5 DFT code. The orthogonal sequences can be represented as [w(o) W(4)] when K=5. Each orthogonal sequence can be associated with a particular sequence index $n_{oc}$. For example, when the sequence index is 0, the orthogonal sequence is [1 1 1 1 1]. When the sequence index is 1, the orthogonal sequence is [1 $e^{j2\pi/5}$ $e^{j4\pi/5}$ $e^{j6\pi/5}$ $e^{j8\pi/5}$]. When the sequence index is 2, the orthogonal sequence is [1 $e^{j4\pi/5}$ $e^{j8\pi/5}$ $e^{j2\pi/5}$ $e^{j6\pi/5}$]. When the sequence index is 3, the orthogonal sequence is [1 $e^{j6\pi/5}$ $e^{j2\pi/5}$ $e^{j8\pi/5}$ $e^{j4\pi/5}$]. When the sequence index is 4, the orthogonal sequence is [1 $e^{j8\pi/5}$ $e^{j6\pi/5}$ $e^{j4\pi/5}$ $e^{j2\pi/5}$]. Therefore, an appropriate orthogonal sequence can be applied to the DMRS sequence when K=5. The design principles described above can be extended when K is greater than five DMRS sequences (or symbols), i.e., when K>5.

The UE can be configured to perform either Type 1 D2D discovery or Type 2 D2D discovery. In Type 1 D2D discovery, the eNB can allocate a D2D discovery resource pool to the UE via a system information block (SIB). The UE can randomly select the D2D discovery resource (e.g., a single subframe) from the D2D discovery resource pool and transmit the K DMRS sequences using the randomly selected D2D discovery resource. In Type 2 D2D discovery, the UE can receive an indication of the D2D discovery resource from the eNB via radio resource control (RRC) signaling. In other words, in Type 2 D2D discovery, the UE can receive an allocation for the D2D discovery resource from the eNB, and then transmit the K DMRS sequences using the allocated D2D discovery resource. The UE can transmit the K DMRS sequences using the D2D discovery resource (e.g., a single subframe) in order to perform channel estimation, timing offset compensation, and frequency offset compensation for D2D discovery. As previously described, a novel orthogonal cover code can be applied to each of the K DMRS sequences prior to transmission of the D2D discovery message with the DMRS sequence in the single subframe.

With respect to the second scenario, a D2D discovery resource of multiple subframes can be used to transmit the DMRS sequences (or symbols) from the UE. The D2D discovery resource can span multiple subframes and multiple physical resource blocks (PRBs). The D2D discovery resource can be used by the UE to send a D2D discovery message. In legacy solutions, the D2D discovery resource would consist of only a single subframe. In the technology described herein, the number of subframes within the D2D discovery resource in a time domain can be greater than one. The number of subframes within the D2D discovery resource can be denoted as M, wherein M is a positive integer greater than one. Similar to the legacy solution, the number of DMRS sequences (or symbols) for each of the M subframes in this scenario is two.

In one example, a length-2M DFT based sequence or Walsh-Hadamard based sequence can be utilized for a predetermined orthogonal cover code (OCC) that is applied to each DMRS sequence. The predetermined OCC can be selected when multiple subframes are applied for discovery packet transmission. In other words, the predetermined OCC can be selected based on a value of M. The first length-2 sequence can applied for the DMRS symbols within the first subframe, the second length-2 sequence can applied for the $2^{nd}$ subframe, and the $M^{th}$ length-2 sequence can applied for the $M^{th}$ subframe.

In one configuration, the UE can generate two DMRS sequences to be transmitted for each subframe of the D2D discovery resource, wherein the D2D discovery resource can include multiple subframes. A predetermined orthogonal cover code (OCC) can be applied to each DMRS sequence, wherein the predetermined OCC is selected based on a value of M. The UE can transmit the two DMRS sequences for each of the M subframes of the D2D discovery resource using a physical uplink shared channel (PUSCH). The two DMRS sequences can be included in the D2D discovery message that is transmitted from the UE. The UE can transmit the two DMRS sequences for each of the M subframes in order to perform channel estimation, timing offset compensation, and frequency offset compensation for D2D discovery.

The UE can be configured to perform either Type 1 D2D discovery or Type 2 D2D discovery. In Type 1 D2D discovery, the eNB can allocate a D2D discovery resource pool to the UE via a system information block (SIB). The UE can randomly select the D2D discovery resource (e.g., multiple subframes) from the D2D discovery resource pool and transmit two DMRS sequences using the multiple subframes of the randomly selected D2D discovery resource. In Type 2 D2D discovery, the UE can receive an indication of the D2D discovery resource (e.g., multiple subframes) from the eNB via radio resource control (RRC) signaling. In other words, in Type 2 D2D discovery, the UE can receive an allocation for the D2D discovery resource from the eNB, and then transmit the two DMRS sequences using the allocated D2D discovery resource of multiple subframes. As previously described, a novel orthogonal cover code can be applied to each DMRS sequence prior to transmission of the D2D discovery message using the D2D discovery resource of the multiple subframes.

Figure 3:
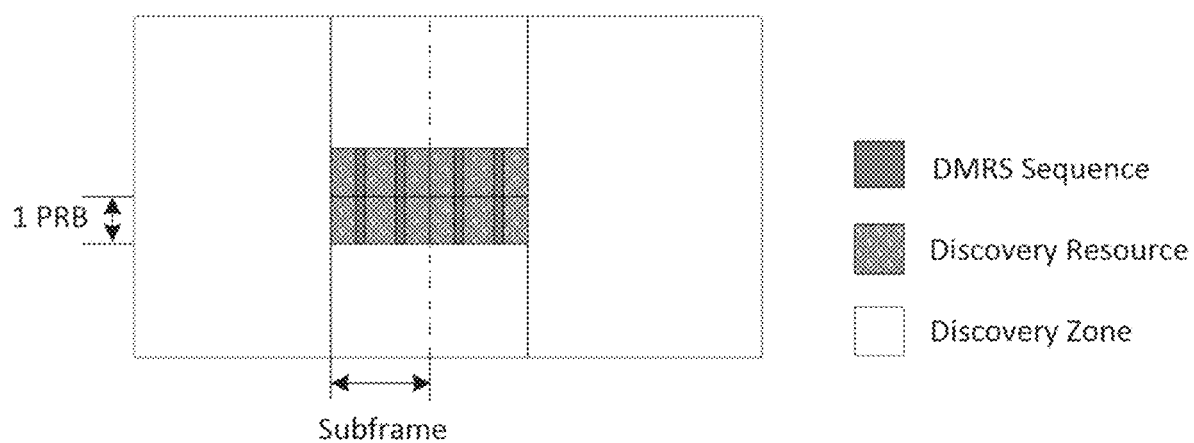
FIG. 3 illustrates discovery resource mapping in a device to device (D2D) discovery zone in accordance with an example.

FIG. 3 illustrates an example of discovery resource mapping in a device to device (D2D) discovery zone. As previously explained, the discovery resource can span multiple subframes and multiple physical resource blocks (PRBs). In the example shown in FIG. 3, the discovery zone can include the discovery resource (i.e., the discovery resource can be mapped from the discovery zone). For the discovery resource, the number of subframes in the time domain (denoted as M) is two and the number of PRBs in the frequency domain (denoted as N) is two. In each subframe, the number of DMRS sequences can be two, as in a legacy PUSCH transmission.

FIG. 4A is a table depicting a set of orthogonal cover codes (OCCs) when a D2D discovery resource spans two subframe (i.e., M=2). The set of OCCs can be used for D2D discovery at the UE. The orthogonal sequences can be based on a length-4 Walsh-Hadamard based sequence. The orthogonal sequences can be represented as [w(o) L W(3)] when M=2. Each orthogonal sequence can be associated with a particular sequence index $n_{oc}$. For example, when the sequence index is 0, the orthogonal sequence is [+1 +1 +1 +1]. When the sequence index is 1, the orthogonal sequence is [+1 −1 +1 −1]. When the sequence index is 2, the orthogonal sequence is [+1 +1 −1 −1]. When the sequence index is 3, the orthogonal sequence is [+1 −1 −1 +1]. Therefore, an appropriate orthogonal sequence can be applied to the DMRS sequence when M=2.

FIG. 4B is a table depicting a set of orthogonal cover codes (OCCs) when a D2D discovery resource spans three subframe (i.e., M=3). The set of OCCs can be used for D2D discovery at the UE. The orthogonal sequences can be based on a length-6 DFT code. The orthogonal sequences can be represented as [w(o) L W(5)] when M=3. Each orthogonal sequence can be associated with a particular sequence index $n_{oc}$. For example, when the sequence index is 0, the orthogonal sequence is [1 1 1 1 1 1]. When the sequence index is 1, the orthogonal sequence is [1 $e^{j\pi/3}$ $e^{j2\pi/3}$ −1 $e^{j4\pi/3}$ $e^{j5\pi/3}$]. When the sequence index is 2, the orthogonal sequence is [1 $e^{j2\pi/3}$ $e^{j4\pi/3}$ 1 $e^{j2\pi/3}$ $e^{j4\pi/3}$]. When the sequence index is 3, the orthogonal sequence is [1 −1 1 −1 1 −1]. When the sequence index is 4, the orthogonal sequence is [1 $e^{j4\pi/3}$ $e^{j2\pi/3}$ 1 $e^{j4\pi/3}$ $e^{j2\pi/3}$]. When the sequence index is 5, the orthogonal sequence is [1 $e^{j5\pi/3}$ $e^{j4\pi/3}$ −1 $e^{j2\pi/3}$ $e^{j\pi/3}$]. Therefore, an appropriate orthogonal sequence can be applied to the DMRS sequence when M=3.

FIG. 4C is a table depicting a set of orthogonal cover codes (OCCs) when a D2D discovery resource spans four subframe (i.e., M=4). The set of OCCs can be used for D2D discovery at the UE. The orthogonal sequences can be based on a length-8 Walsh-Hadamard based sequence. The orthogonal sequences can be represented as [w(o) L W(7)] when M=4. Each orthogonal sequence can be associated with a particular sequence index $n_{oc}$. For example, when the sequence index is 0, the orthogonal sequence is [+1 +1 +1 +1 +1 +1 +1 +1]. When the sequence index is 1, the orthogonal sequence is [+1 −1 +1 −1 +1 −1 +1 −1]. When the sequence index is 2, the orthogonal sequence is [+1 +1 −1 −1 +1 +1 −1 −1]. When the sequence index is 3, the orthogonal sequence is [+1 −1 −1 +1 +1 −1 −1 +1]. When the sequence index is 4, the orthogonal sequence is [+1 +1 +1 +1 −1 −1 −1 −1]. When the sequence index is 5, the orthogonal sequence is [+1 −1 +1 −1 −1 +1 −1 +1]. When the sequence index is 6, the orthogonal sequence is [+1 +1 −1 −1 −1 −1 +1 +1]. When the sequence index is 7, the orthogonal sequence is [+1 −1 −1 +1 −1 +1 +1 −1]. Therefore, an appropriate orthogonal sequence can be applied to the DMRS sequence when M=4.

The design principles described above can be extended when M is greater than four subframes per D2D discovery resource i.e., when M>4.

With respect to the third scenario, a D2D discovery resource can span multiple subframes and additional DMRS sequences (or symbols) are included for each subframe of the D2D discovery resource. The number of subframes in a time domain within the D2D discovery resource can be denoted as M, wherein M is a positive integer greater than one. The number of DMRS sequences for each subframe within the D2D discovery resource can be denoted as K, wherein K is a positive integer greater than two.

In one example, a length-MK DFT based sequence or Walsh-Hadamard based sequence can be utilized for a predetermined orthogonal cover code (OCC) that is applied to each DMRS sequence. The predetermined OCC can be applied when the D2D discovery resource spans multiple subframes and additional DMRS symbols are included in each subframe. The first length-K sequence can be applied for the first DMRS sequence within the first subframe, the second length-K sequence can be applied for the second subframe, and the $M^{th}$ length-K sequence can be applied for the $M^{th}$ subframe.

In one configuration, the UE can generate K DMRS sequences to be transmitted for each subframe of the D2D discovery resource, wherein the D2D discovery resource can include multiple subframes. A predetermined orthogonal cover code (OCC) can be applied to each DMRS sequence, wherein the predetermined OCC is selected based on a value of M and a value of K. The UE can transmit the K DMRS sequences for each of the M subframes of the D2D discovery resource using a physical uplink shared channel (PUSCH). The K DMRS sequences can be included in the D2D discovery message that is transmitted from the UE. The UE can transmit the K DMRS sequences for each of the M subframes in order to perform channel estimation, timing offset compensation, and frequency offset compensation for D2D discovery. In this scenario, the total number of DMRS sequences in one discovery resource can be calculated as M×K, wherein M is the number of subframes for the discovery packet transmission and K is the number of DMRS symbols within one subframe.

When M=2 and K=3, a length-6 DFT based sequence is utilized for an orthogonal sequence, wherein the length-6 DFT based sequence is similar to as described above.

When M=2 and K=4, a length-8 Walsh-Hadamard based sequence is utilized for an orthogonal sequence, wherein the length-8 Walsh-Hadamard based sequence is similar to as described above.

The design principles described above can be extended when M is greater than two subframes and/or K is greater than two DMRS symbols, i.e., when M>2 and/or K>2.

In one configuration, the UE can perform a repeated transmission of the DMRS sequences for Type 1 D2D discovery. A novel DMRS sequence design for repeated transmissions is described herein. The UE can repeatedly transmit (e.g., either contiguously or non-contiguously) a given discovery MAC PDU within a discovery period. The eNB can allocate a D2D discovery resource pool (or a set of discovery resources) for the UE. The resources in the D2D discovery resource pool can be used for the repeated transmissions of the discovery MAC PDU. The UE can perform a random selection of a first resource from the D2D discovery pool. The UE can use the first resource for transmitting a first discovery MAC PDU. The UE can subsequently use other resources for subsequent discovery MAC PDU transmissions, wherein the other resources are deterministically associated with the first resource. Alternatively, the UE can perform random selection for each resource in a D2D discovery resource pool (as opposed to the random selection of only the first resource). The UE can be configured to perform a defined number of repeated transmissions.

For repeated transmission, ProSe-enabled UEs can transmit multiple copies of the discovery packets within one D2D discovery zone. In particular, each D2D discovery zone (DZ) can be divided into N sub-DZs, and the D2D UEs can transmit one discovery packet in each sub-DZ. There can be two scenarios with respect to repeated transmissions of the discovery packets from the UE. In the first scenario, the UE can randomly select the resource only for the first transmission, and the resources for subsequent transmissions are deterministically associated with the first resource. In other words, a frequency and time location of the subsequent transmission is determined by the initial transmission. The UE can randomly select the resource from a D2D discovery resource pool that is allocated by the eNB. In addition, the UE can randomly choose one DMRS sequence for transmission within this selected discovery resource. In other words, the UE can transmit the DMRS sequence using the discovery resource selected from the D2D discovery resource pool. The UE can subsequently transmit another DMRS sequence that is related (or identical) to the initial DMRS sequence. Even though the subsequent transmission can be performed using another discovery resource that is selected from a separate D2D discovery resource pool, the subsequent discovery resource can be derived from the initial discovery resource. In the second scenario, the UE can randomly select the resources for all the transmissions. In other words, in this scenario, the resources that are subsequently selected are not associated with the resource that is initially selected. In addition, the UE can randomly select the DMRS sequence for each of the randomly selected resources. In this scenario, the subsequent DMRS sequences are not associated with the initial DMRS sequence.

With respect to the first scenario, there are several manners in which the UE can perform the DMRS sequence selection. In one example, the UE can randomly select the DMRS sequences from a DMRS sequence pool for the first transmission. The DMRS sequence pool can be a subset of all available DMRS sequences and can be predefined or configured by the network, or alternatively, the DMRS sequence pool can be a full set of all available DMRS sequences. The UE can perform the first transmission using a randomly selected resource. The UE can randomly select the resource from a D2D discovery resource pool that is allocated by the eNB. For the subsequent transmission, the UE can choose an identical DMRS sequence as the first transmission. Each subsequent transmission of the DMRS sequence can be performed using discovery resources that are selected from separate discovery resource pools allocated by the eNB. Therefore, the discovering UE can combine the correlation energy of multiple transmissions to improve DMRS detection performance.

In another example, the UE can randomly select the DMRS sequence from a DMRS sequence pool for the first transmission. The UE can generate a subsequent DMRS sequence by performing DMRS sequence hopping on the initial DMRS sequence (i.e., for the first transmission). In other words, the subsequent DMRS sequence can be associated with the initial DMRS sequence after DMRS sequence hopping is performed, but the two DMRS sequences are not identical. A DMRS sequence hopping pattern can be cell-specific or common across the network to allow for efficient discovery. In some examples, either base sequence hopping, or cyclic shift hopping or orthogonal cover code hopping or any combination of the above options can be utilized for DMRS sequence hopping. For instance, for cyclic shift hopping, the UE can select a DMRS sequence for the first transmission to have a cyclic shift index $n_{CS}$. In the subsequent transmission, the UE can transmit a DMRS sequence with cyclic shift index of: $n_{CS}(k)=(n_{CS}+k \cdot L) \bmod N_{CS}$, wherein k is a repeated transmission index, L is a hopping distance (which can be predefined or signaled by a higher layer), and $N_{CS}$ is the total number of cyclic shifts (e.g., 12 cyclic shifts). In another example, the hopping pattern for the DMRS sequence can be the same as the hopping pattern applied for resource hopping with respect to repeated transmissions.

In yet another example, the UE can randomly select the DMRS sequences for all of the transmissions. For this scheme, consistent collision of DMRS sequence transmissions can be avoided. However, the detection gain from combining multiple received copies of the DMRS symbols cannot be realized.

With respect to the second scenario, the UE can randomly select the resources for all of the transmissions. The UE can randomly select the resources from a plurality of D2D discovery resource pools allocated by the eNB. In this case, an initial resource used for transmitting the discovery packet is not related to or associated with a subsequent resource used for transmitting a later discovery packet. In addition, the UE can randomly select the DMRS sequences for all of the transmissions. Unlike the previous scenario, an initial DMRS sequence selected for transmission is not identical to or associated with a subsequent DMRS sequence that is selected for transmission. The UE can transmit a first randomly selected DMRS sequence using a first randomly selected discovery resource, and then subsequently transmit a second randomly selected DMRS sequence using a second randomly selected discovery resource, wherein the DMRS sequence and discovery resource from the first transmission is not related to the DMRS sequence and discovery resource from the second transmission.

In one configuration, the UE can perform a repeated transmission of the DMRS sequences for Type 2 D2D discovery. A novel DMRS sequence design can be applicable for Type 2 D2D discovery. Type 2 D2D discovery is a procedure where resources for discovery signal transmissions are allocated on a per UE specific basis. In Type 2A, resources are allocated for each specific transmission instance of discovery signals. In Type 2B, resources are semi-persistently allocated for discovery signal transmissions. Type 2 discovery can be controlled by the eNB and not the UE. In contrast, Type 1 D2D discovery is a discovery procedure where resources for discovery signal transmissions are allocated on a non-UE specific basis. The resources can be for all UEs or a group of UEs. Type 1 D2D is for contention based D2D discovery, such that the UE randomly chooses the D2D discovery resource for the transmission. The utilization of DMRS base sequences for Type 2 discovery is subject to similar considerations as for Type 1 discovery. The DMRS sequences can either be network-common or pre-configured or associated with a synchronization source identity.

Several options can be considered for DMRS sequence design for Type 2 discovery. In the first option, a D2D transmitter (Tx) UE can randomly select a DMRS sequence with a defined cyclic shift (CS) and a defined orthogonal cover code (OCC). The D2D Tx UE can select the DMRS sequence for transmission in each discovery period (for Type 2B discovery) or for each transmission instance (for Type 2A discovery). In the second option, the D2D Tx UE can apply DMRS sequence hopping for the transmission in each discovery period (for Type 2B discovery). An initial choice of the DMRS sequence can be randomly chosen by the UE or assigned by the eNB. In the third option, the D2D Tx UE can use the same DMRS sequence for the transmission in each discovery period (for Type 2B discovery). An initial choice of the DMRS sequence can be randomly chosen by the UE or assigned by the eNB. When repeated transmissions are configured or allowed for Type 2 discovery, similar options as compared to Type 1 discovery can apply for DMRS sequence choices within a discovery period.

In one configuration, for Type 1 discovery, a subset of DMRS sequences can be configured for ProSe-enabled devices in order to reduce DMRS blind detection complexity at the UE. A reduction of DMRS blind detection complexity can result in power consumption savings at the UE. To further improve the orthogonality and channel separation, especially in the presence of practical impairment, DMRS sequences with relatively large cyclic shift (CS) separation and appropriate orthogonal cover codes (OCCs) can be configured.

In one example, two OCCs with an identical CS may not be configured for the DMRS sequence. For instance, OCC index 0 and 1 cannot be configured together with CS index 0. This is primarily due to the fact that certain ambiguity occurs between phase rotations of two DMRS symbols introduced by the OCC and large frequency offset. In this case, discovering UE may be unable to differentiate the OCC or estimate frequency offset correctly. As a result, the discovering UE may be unable to identify the correct DMRS sequences.

In another example, two OCCs with a CS offset can be configured for the DMRS sequence. As a non-limiting example, the configuration can be DMRS Configuration I: CS and OCC index $\{n_{CS}, n_{OCC}\} \in \{\{0,0\}, \{3,1\}, \{6,0\}, \{9,1\}\}$. In this case, the total number of DMRS sequences is 4. As another non-limiting example, the configuration can be DMRS Configuration II: CS and OCC index $\{n_{CS}, n_{OCC}\} \in \{\{0,0\}, \{2,1\}, \{4,0\}, \{6,1\}, \{8,0\}, \{10,1\}\}$. In this case, the total number of DMRS sequence is 6. Although DMRS Configuration I can outperform DMRS Configuration II in terms of DMRS blind detection performance, the DM-RS collision probability can be higher for DMRS Configuration I as compared to DMRS Configuration II.

In yet another example, only a CS with a single OCC index can be configured for the DMRS sequence. Two non-limiting examples of such configurations can be DMRS Configuration IA: CS and OCC index $\{n_{CS}, n_{OCC}\} \in \{\{0,0\}, \{3,0\}, \{6,0\}, \{9,0\}\}$ and DMRS Configuration IIA: CS and OCC index $\{n_{CS}, n_{OCC}\} \in \{\{0,0\}, \{2,0\}, \{4,0\}, \{6,0\}, \{8,0\}, \{10,0\}\}$.

Figure 5:
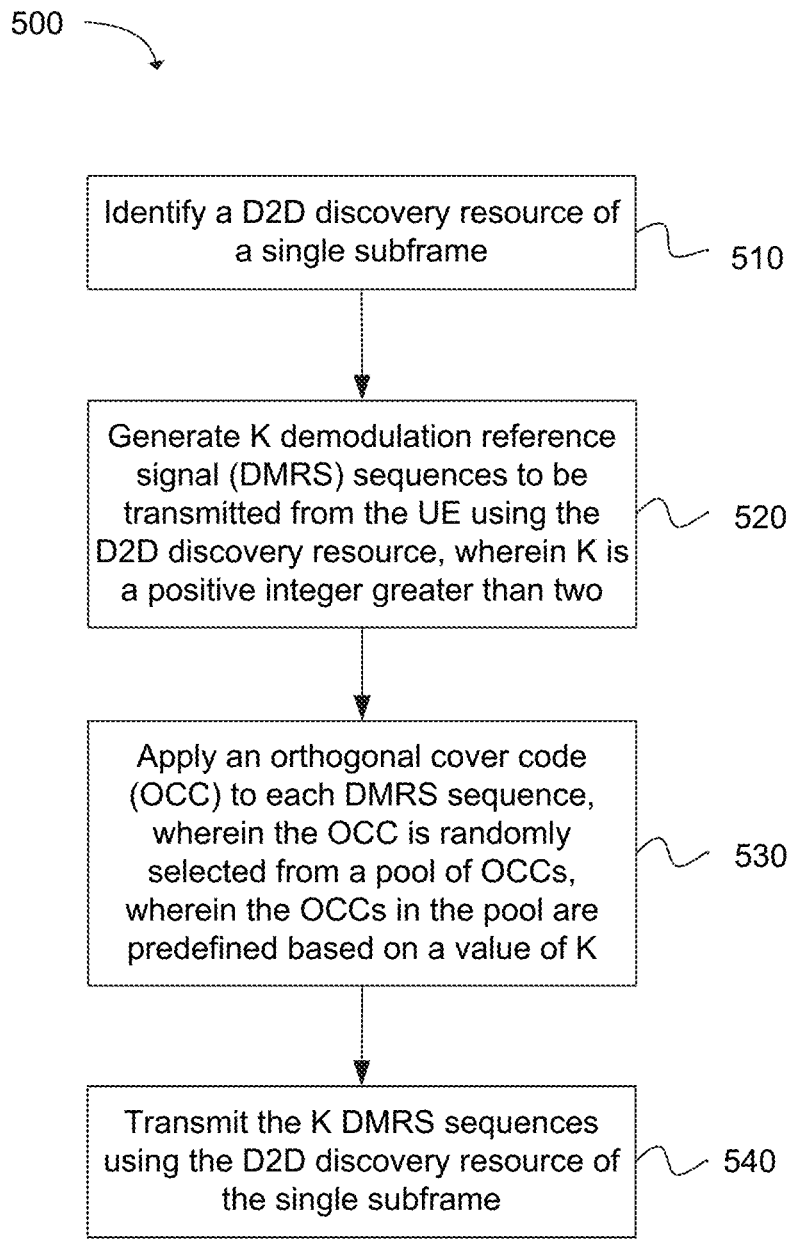
FIG. 5 depicts functionality of a user equipment (UE) operable to perform device-to-device (D2D) discovery in accordance with an example.

Another example provides functionality 500 of a user equipment (UE) comprising one or more processors configured to perform device-to-device (D2D) discovery, as shown in the flow chart in FIG. 5. The functionality can be implemented as a method or the functionality can be executed as instructions on a machine, where the instructions are included on at least one computer readable medium or one non-transitory machine readable storage medium. The one or more processors can be configured to identify a D2D discovery resource of a single subframe, as in block 510. The one or more processors can be configured to generate K demodulation reference signal (DMRS) sequences to be transmitted from the UE using the D2D discovery resource, wherein K is a positive integer greater than two, as in block 520. The one or more processors can be configured to apply an orthogonal cover code (OCC) to each DMRS sequence, wherein the OCC is randomly selected from a pool of OCCs, wherein the OCCs in the pool are predefined based on a value of K, as in block 530. The one or more processors can be configured to transmit the K DMRS sequences using the D2D discovery resource of the single subframe, as in block 540.

In one configuration, a first processor can perform the operations in blocks 510, 520 and 530. The first processor can be a single processor, or alternatively, the first processor can be comprised of one or more separate processors. In one configuration, a second processor can perform the operation in block 540. One example of the second processor is a baseband processor.

In one example, the one or more processors are further configured to transmit the K DMRS sequences in a D2D discovery message using a physical uplink shared channel (PUSCH). In another example, the one or more processors are further configured to randomly select the D2D discovery resource from a D2D discovery resource pool, wherein the D2D discovery resource pool is allocated by an evolved node B (eNB) and indicated to the UE via a system information block (SIB). In yet another example, the one or more processors are further configured to receive an indication of the D2D discovery resource from an evolved node B (eNB) via radio resource control (RRC) signaling.

In one example, the one or more processors are further configured to transmit the K DMRS sequences using the single subframe of the D2D discovery resource. In another example, the UE is configured to perform Type 1 D2D discovery or Type 2 D2D discovery. In yet another example, the UE includes an antenna, a touch sensitive display screen, a speaker, a microphone, a graphics processor, an application processor, an internal memory, or a non-volatile memory port.

Figure 6:
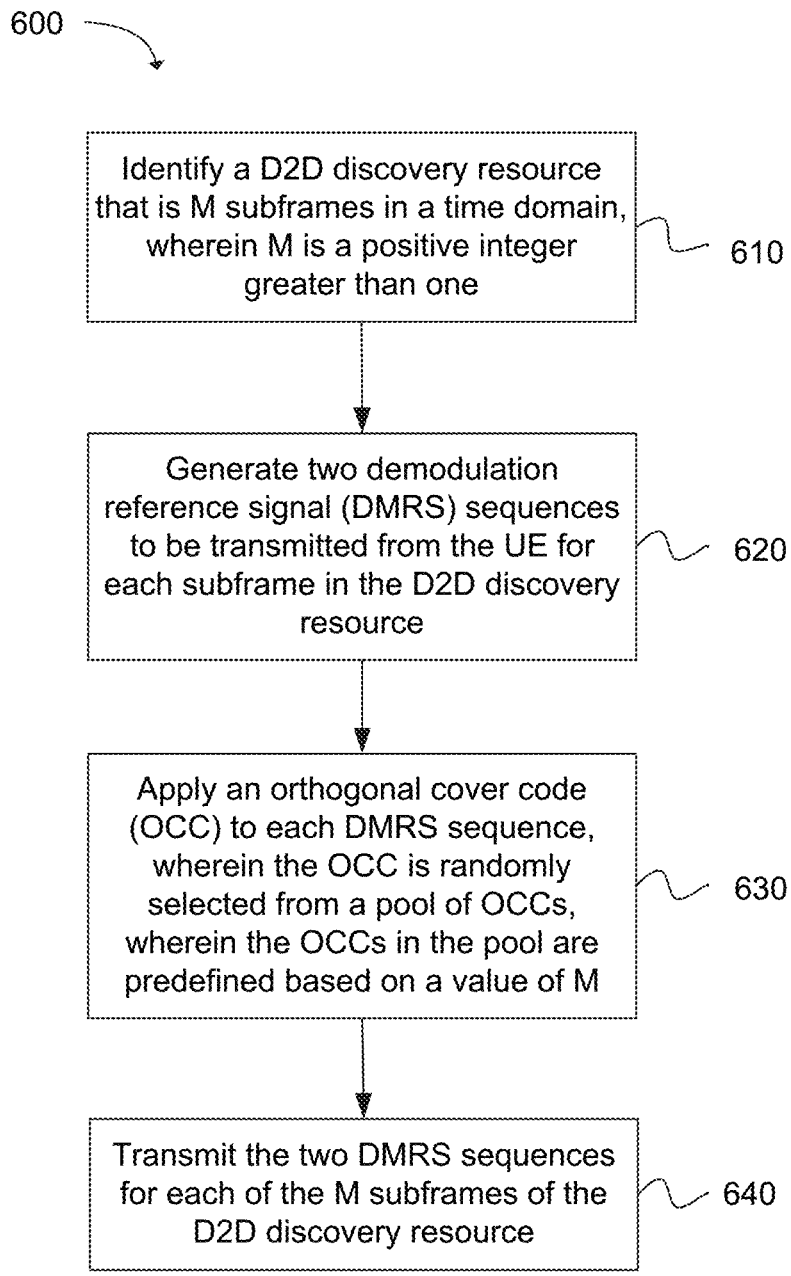
FIG. 6 depicts functionality of a user equipment (UE) operable to perform device-to-device (D2D) discovery in accordance with an example.

Another example provides functionality 600 of a user equipment (UE) comprising one or more processors configured to perform device-to-device (D2D) discovery, as shown in the flow chart in FIG. 6. The functionality can be implemented as a method or the functionality can be executed as instructions on a machine, where the instructions are included on at least one computer readable medium or one non-transitory machine readable storage medium. The one or more processors can be configured to identify a D2D discovery resource that is M subframes in a time domain, wherein M is a positive integer greater than one, as in block 610. The one or more processors can be configured to generate two demodulation reference signal (DMRS) sequences to be transmitted from the UE for each subframe in the D2D discovery resource, as in block 620. The one or more processors can be configured to apply an orthogonal cover code (OCC) to each DMRS sequence, wherein the OCC is randomly selected from a pool of OCCs, wherein the OCCs in the pool are predefined based on a value of M, as in block 630. The one or more processors can be configured to transmit the two DMRS sequences for each of the M subframes of the D2D discovery resource, as in block 640.

In one configuration, a first processor can perform the operations in blocks 610, 620 and 630. The first processor can be a single processor, or alternatively, the first processor can be comprised of one or more separate processors. In one configuration, a second processor can perform the operation in block 640. One example of the second processor is a baseband processor.

In one example, the one or more processors are further configured to transmit the two DMRS sequences in a D2D discovery message using a physical uplink shared channel (PUSCH). In another example, the one or more processors are further configured to randomly select the D2D discovery resource from a D2D discovery resource pool allocated by an evolved node B (eNB). In yet another example, the one or more processors are further configured to transmit the two DMRS sequences for each of the M subframes.

Figure 7:
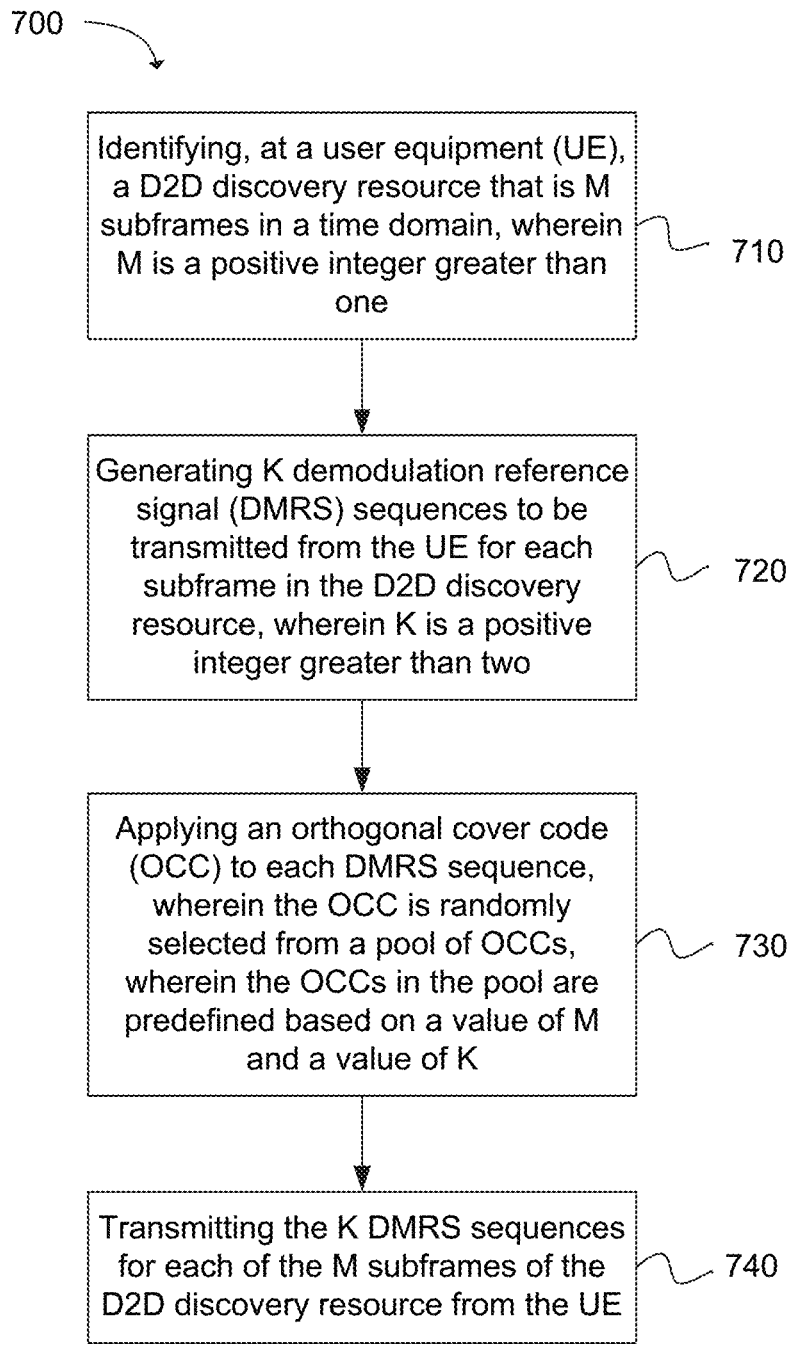
FIG. 7 depicts a flow chart of a method for performing device-to-device (D2D) discovery in accordance with an example.

Another example provides a method 700 for performing device-to-device (D2D) discovery, as shown in the flow chart in FIG. 7. The method can be executed as instructions on a machine, where the instructions are included on at least one computer readable medium or one non-transitory machine readable storage medium. The method can include the operation of identifying, at a user equipment (UE), a D2D discovery resource that is M subframes in a time domain, wherein M is a positive integer greater than one, as in block 710. The method can include the operation of generating K demodulation reference signal (DMRS) sequences to be transmitted from the UE for each subframe in the D2D discovery resource, wherein K is a positive integer greater than two, as in block 720. The method can include the operation of applying an orthogonal cover code (OCC) to each DMRS sequence, wherein the OCC is randomly selected from a pool of OCCs, wherein the OCCs in the pool are predefined based on a value of M and a value of K, as in block 730. The method can include the operation of transmitting the K DMRS sequences for each of the M subframes of the D2D discovery resource from the UE, as in block 740.

In one example, the K DMRS sequences for each of the M subframes are transmitted using a physical uplink shared channel (PUSCH). In another example, Type 1 D2D discovery or Type 2 D2D discovery is performed at the UE.

Figure 8:
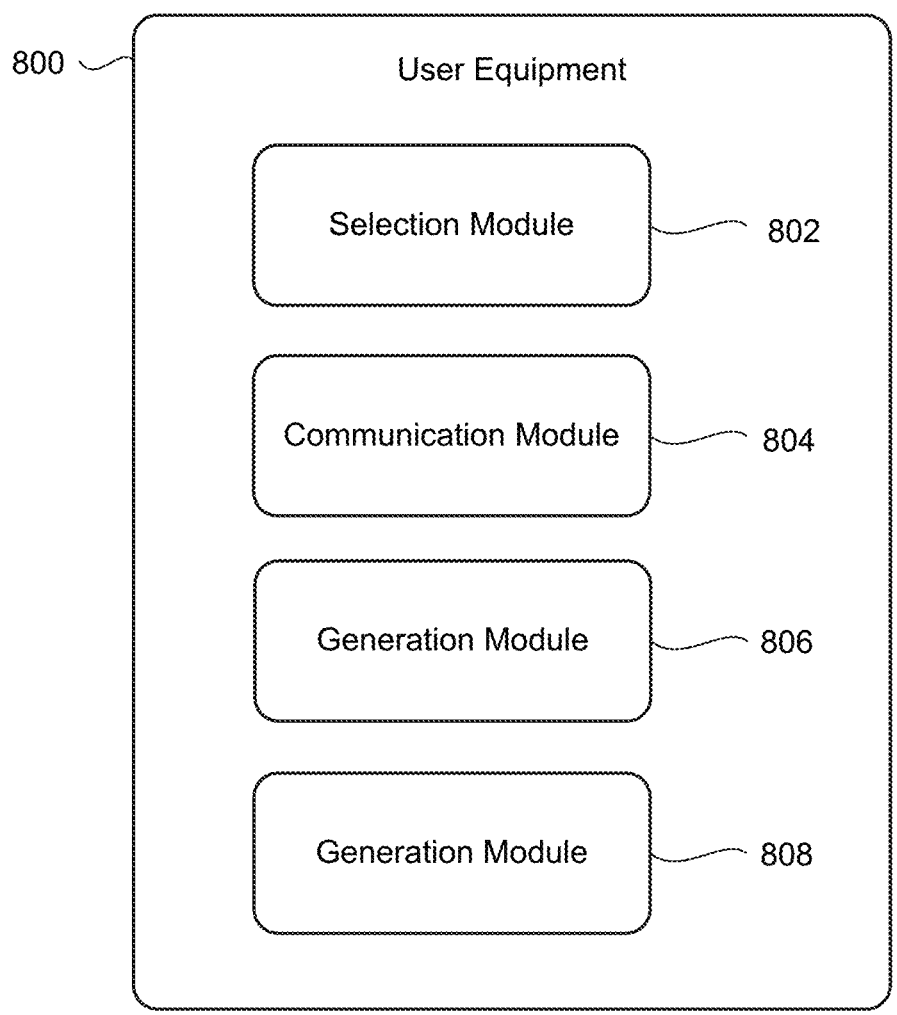
FIG. 8 depicts functionality of a user equipment (UE) operable to perform device-to-device (D2D) discovery in accordance with an example.

FIG. 8 depicts functionality of a user equipment (UE) 800 operable to perform device-to-device (D2D) discovery. The UE 800 can include a selection module 802 configured to select a first demodulation reference signal (DMRS) sequence from a pool of DMRS sequences for D2D discovery. The selection module 802 can be configured to select a first D2D discovery resource from a first D2D discovery resource pool allocated by an evolved node B. The UE 800 can include a communication module 804 configured to transmit the first DMRS sequence from the UE 800 using the first D2D discovery resource selected from the D2D discovery resource pool, wherein a second DMRS sequence is subsequently transmitted from the UE 800 using a second D2D discovery resource that is selected from a second D2D discovery resource pool allocated by the eNB In one example, the selection module 802 can be further configured to: randomly select the first DMRS sequence from the pool of DMRS sequences; and select the second D2D discovery resource based on the first D2D discovery resource. In another example, the communication module 804 can be further configured to transmit a DMRS sequence in each discovery subzone within a configured discovery period. In yet another example, the second DMRS sequence is identical to the first DMRS sequence In one example, the UE 800 can include a generation module 806 configured to generate the second DMRS sequence by performing DMRS sequence hopping on the first DMRS sequence, wherein the DMRS sequence hopping utilizes at least one of: base sequence hopping, cyclic shift hopping, or orthogonal code cover hopping. In another example, the selection module 804 can be further configured to randomly select the first D2D discovery resource from the D2D discovery resource pool, wherein the second D2D discovery resource is deterministically associated with the first D2D discovery resource. In yet another example, the selection module 804 can be further configured to randomly select the first DMRS sequence and the second DMRS sequence at substantially a same time, wherein the second DMRS sequence is distinguishable from the first DMRS sequence.

In one example, the selection module 804 can be further configured to randomly select the first D2D discovery resource and the second D2D discovery resource at substantially a same time, wherein the second D2D discovery resource is not associated with the first D2D discovery resource. In another example, the UE 800 is configured to perform Type 1 D2D discovery or Type 2 D2D discovery. In yet another example, the UE 800 can include a discovery module 808 configured to perform the D2D discovery using a subset of the pool of DMRS sequences, wherein each DMRS sequence in the subset is associated with a configured number of cyclic shift (CS) and a configured number of orthogonal cover codes (OCCs).

Figure 9:
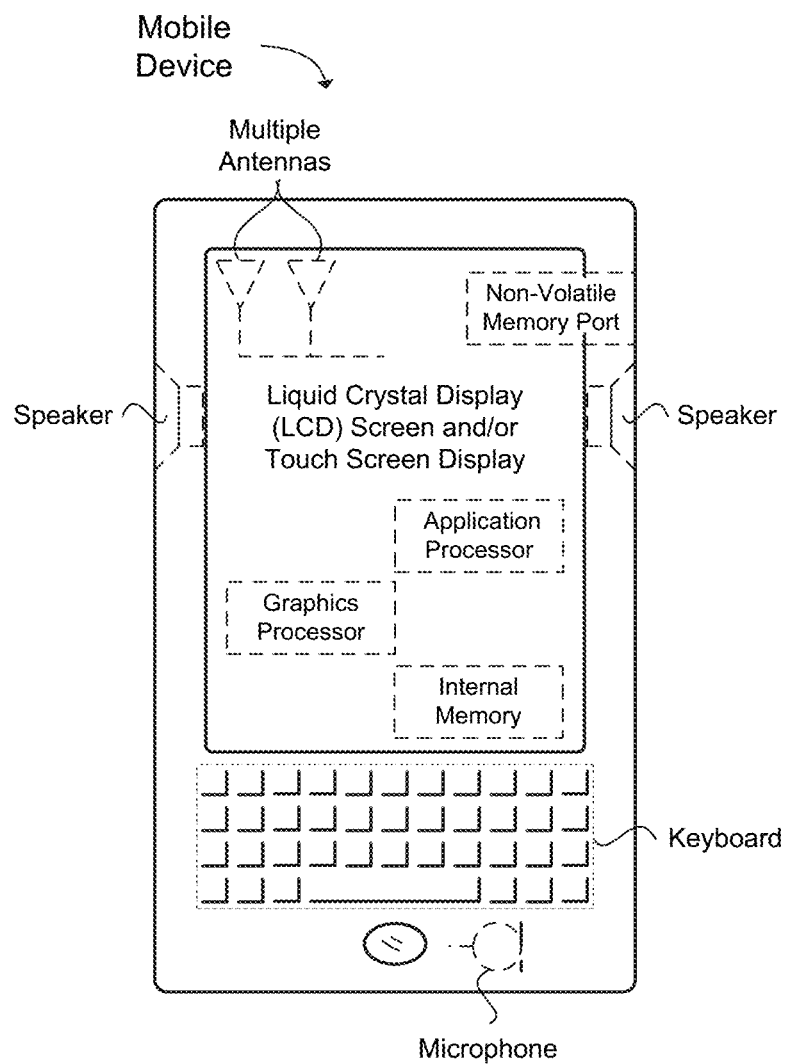
FIG. 9 illustrates a diagram of a wireless device (e.g., UE) in accordance with an example.

FIG. 9 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 9 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention.

One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus of a user equipment (UE) operable to perform device-to-device (D2D) communication, the apparatus comprising:
   one or more processors configured to:
      select, at the UE, a cyclic shift (ncs) that is randomly selected from a set of cyclic shifts, wherein the set of cyclic shifts consists of cyclic shift values of $\{0, 3, 6, 91\}$
      apply, at the UE, the selected cyclic shift to all demodulation reference signals (DM-RSs) in a subframe, the subframe including at least three DM-RS symbols, wherein each of the DM-RSs are associated with a D2D transmission from the UE;
      encode, at the UE, the DM-RSs for transmission from the UE; and
      perform D2D communication with a second UE via a physical channel between the UE and the second UE; and
   memory configured to store the set of cyclic shifts.

2. The apparatus of claim 1, further comprising a transceiver configured to transmit the DM-RSs to a second UE.

3. The apparatus of claim 1, further comprising a transceiver configured to send the D2D transmission to a second UE.

4. The apparatus of claim 1, wherein the UE includes an antenna, a touch sensitive display screen, a speaker, a microphone, a graphics processor, an application processor, an internal memory, or a non-volatile memory port.

5. An apparatus of a first user equipment (UE) operable to decode a device-to-device (D2D) transmission received from a second UE, the apparatus comprising:
   one or more processors configured to:
      detect, at the first UE, a demodulation reference signal (DM-RS) received from the second UE in a subframe, wherein the DM-RS is associated with a D2D transmission from the second UE;
      determine, at the first UE, a cyclic shift (ncs) utilized to generate the DM-RS, wherein the cyclic shift has been applied to all DM-RSs in the subframe and is included in a set of cyclic shifts, the subframe including at least three DM-RS symbols, wherein the set of cyclic shifts consists of cyclic shift values of $(0, 3, 6, 9\}$, wherein the cyclic shift used to generate the DM-RS is randomly selected from the set of cyclic shifts;
      perform, at the first UE, a channel estimation based on the DM-RS and the cyclic shift to decode the D2D transmission received from the second UE; and
      perform D2D communication with the second UE via a physical channel between the first UE and the second UE; and memory configured to store the DM-RS and the set of cyclic shifts.

6. The apparatus of claim 5, further comprising a transceiver configured to receive the DM-RS from the second UE.

7. The apparatus of claim 5, further comprising a transceiver configured to receive the D2D transmission from the second UE.

8. The apparatus of claim 5, wherein the one or more processors are configured to perform Type 1 D2D discovery or Type 2 D2D discovery between the first UE and the second UE.

9. The apparatus of claim 5, wherein the first UE includes an antenna, a touch sensitive display screen, a speaker, a microphone, a graphics processor, an application processor, an internal memory, or a non-volatile memory port.

10. At least one non-transitory machine readable storage medium having instructions embodied thereon for performing device-to-device (D2D) communication at a user equipment (UE), the instructions when executed perform the following:
    selecting, at the UE, a cyclic shift (ncs) that is randomly selected from a set of cyclic shifts consisting of cyclic shift values of (0, 3, 6, 9 };
    applying, at the UE, the selected cyclic shift to all demodulation reference signals (DM-RSs) in a subframe, the subframe including at least three DM-RS symbols, wherein each of the DM-RSs are associated with a D2D transmission from the UE;
    encoding, at the UE, the DM-RSs for transmission from the UE; and
    performing D2D communication with a second UE via a physical channel between the UE and the second UE.

11. The at least one non-transitory machine readable storage medium of claim 10, further comprising instructions when executed perform the following: encoding the DM-RSs for transmission to a second UE.

12. The at least one non-transitory machine readable storage medium of claim 10, further comprising instructions when executed perform the following: encoding the D2D transmission for delivery to a second UE.

13. At least one non-transitory machine readable storage medium having instructions embodied thereon for decoding a device-to-device (D2D) transmission received from a second UE, the instructions when executed perform the following:
    detecting, at a first UE, a demodulation reference signal (DM-RS) received from the second UE in a subframe, wherein the DM-RS is associated with a D2D transmission from the second UE;
    determining, at the first UE, a cyclic shift (ncs) utilized to generate the DM-RS, wherein the cyclic shift has been applied to all DM-RSs in the subframe and is included in a set of cyclic shifts, the subframe including at least three DM-RS symbols, wherein the set of cyclic shifts consists of cyclic shift values of (0, 3, 6, 9 }, wherein the cyclic shift used to generate the DM-RS is randomly selected from the set of cyclic shifts;
    performing, at the first UE, a channel estimation based on the DM-RS and the cyclic shift to decode the D2D transmission received from the second UE; and
    performing D2D communication with the second UE via a physical channel between the first UE and the second UE.

14. The at least one non-transitory machine readable storage medium of claim 13, further comprising instructions when executed perform the following: performing Type 1 D2D discovery or Type 2 D2D discovery between the first UE and the second UE.

* * * * *